US012586497B2

(12) United States Patent
Song et al.

(10) Patent No.: US 12,586,497 B2
(45) Date of Patent: Mar. 24, 2026

(54) METHOD FOR EVALUATING LIFESPAN OF DISPLAY PANEL AND LIFESPAN EVALUATION SYSTEM FOR DISPLAY PANEL

(71) Applicant: Samsung Display Co., LTD., Yongin-si (KR)

(72) Inventors: Hee-Kwang Song, Yongin-si (KR); Sang Joon Ryu, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/969,000

(22) Filed: Dec. 4, 2024

(65) Prior Publication Data

US 2025/0273101 A1 Aug. 28, 2025

(30) Foreign Application Priority Data

Feb. 27, 2024 (KR) ........................ 10-2024-0028090

(51) Int. Cl.
*G09G 3/00* (2006.01)
*G01J 3/28* (2006.01)
*G09G 3/3208* (2016.01)

(52) U.S. Cl.
CPC ............... *G09G 3/006* (2013.01); *G01J 3/28* (2013.01); *G09G 3/3208* (2013.01); *G09G 2320/048* (2013.01); *G09G 2360/16* (2013.01)

(58) Field of Classification Search
CPC .. G09G 2320/048; G09G 2320/00–106; G01J 3/28
See application file for complete search history.

(56) References Cited

U.S. PATENT DOCUMENTS

| | | | | |
|---|---|---|---|---|
| 9,177,503 | B2 * | 11/2015 | Lynch .................... | H10K 59/65 |
| 10,839,734 | B2 * | 11/2020 | Adamovich ......... | G09G 3/3225 |
| 2005/0088389 | A1 * | 4/2005 | Ten ........................ | H04N 17/04 |
| | | | | 348/E17.005 |
| 2016/0343349 | A1 * | 11/2016 | Machida .............. | G09G 3/2014 |
| 2022/0059051 | A1 * | 2/2022 | An .......................... | G09G 5/393 |

(Continued)

FOREIGN PATENT DOCUMENTS

| | | |
|---|---|---|
| KR | 10-2326002 A | 11/2021 |
| KR | 10-2400138 A | 5/2022 |

*Primary Examiner* — Bipin Gyawali
(74) *Attorney, Agent, or Firm* — Womble Bond Dickinson (US) LLP

(57) ABSTRACT

A method for evaluating a lifespan of a display panel includes deteriorating a display panel including a first single color area, a second single color area, a third single color area, and a mixed color area, measuring first single color luminance retention rates of the first to third single color areas and a first mixed color luminance retention rate of the mixed color area at luminance measurement time points, calculating mixed color spectrums of the mixed color area at the luminance measurement time points based on second single color luminance retention rates of the first to third single color areas converted from the first single color luminance retention rates, calculating mixed color offset values based on the mixed color spectrums, and calculating a second mixed color luminance retention rate of the mixed color area by applying the mixed color offset values to the first mixed color luminance retention rate.

20 Claims, 9 Drawing Sheets

(56) References Cited

U.S. PATENT DOCUMENTS

| 2023/0116648 A1* | 4/2023 | Sung | G09G 3/3208 |
| | | | 356/237.2 |
| 2024/0184164 A1* | 6/2024 | Hu | G02F 1/133521 |
| 2024/0379068 A1* | 11/2024 | Moon | G09G 3/3266 |
| 2025/0292713 A1* | 9/2025 | Pyo | G09G 3/2003 |
| 2025/0322775 A1* | 10/2025 | Song | H10K 71/831 |

* cited by examiner

F I G . 4
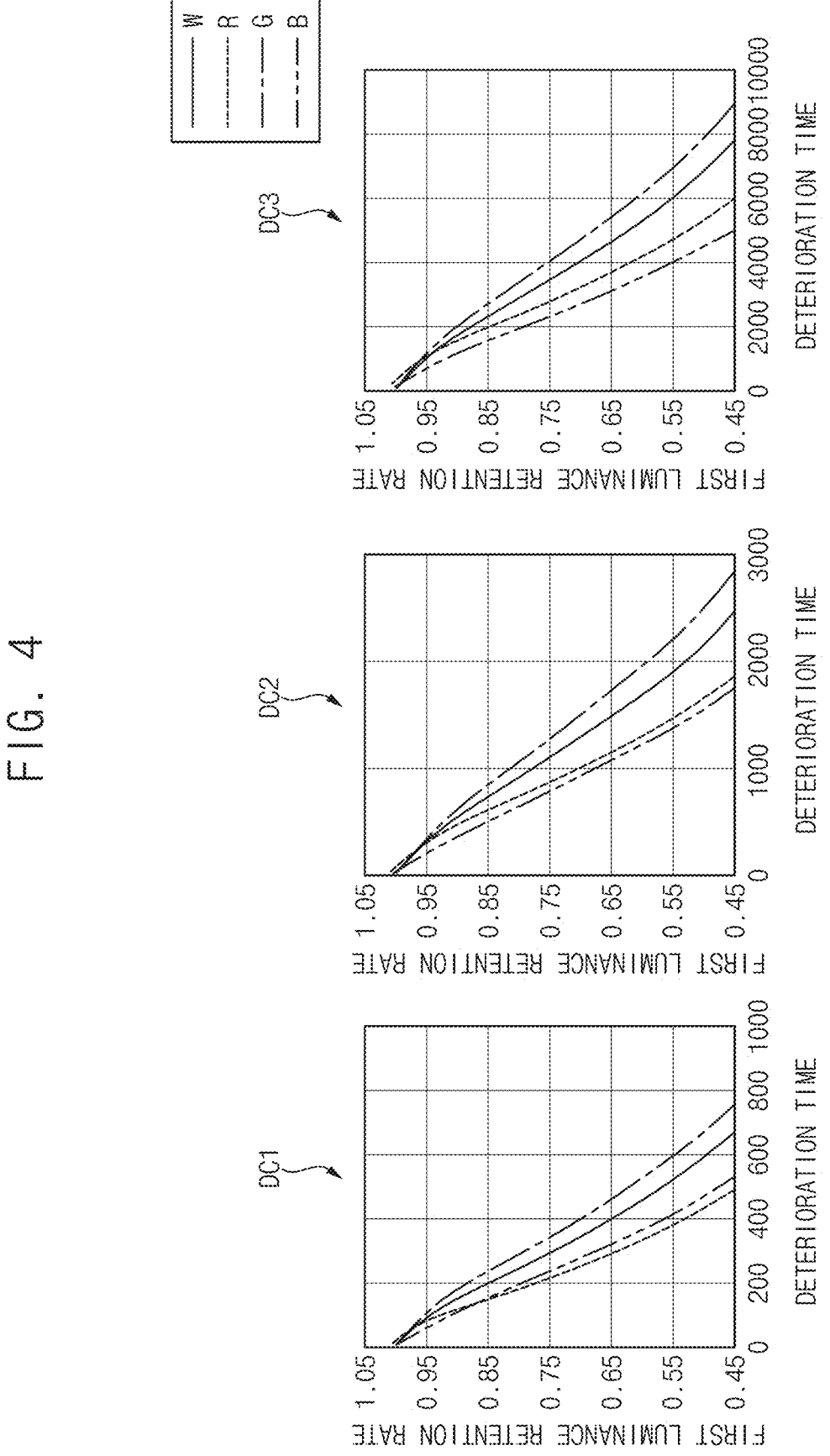

METHOD FOR EVALUATING LIFESPAN OF DISPLAY PANEL AND LIFESPAN EVALUATION SYSTEM FOR DISPLAY PANEL

CROSS-REFERENCE TO RELATED APPLICATION(S)

The present application claims priority to and the benefit of Korean Patent Application No. 10-2024-0028090 filed on Feb. 27, 2024, in the Korean Intellectual Property Office (KIPO), the entire disclosure of which is incorporated herein by reference.

BACKGROUND

1. Field

Aspects of some embodiments relate to a method for evaluating a lifespan of a display panel.

2. Description of the Related Art

A display device may include a display panel that displays images. The display device may include an organic light-emitting display panel, an inorganic light-emitting display panel, a quantum dot light-emitting display panel, etc. as the display panel. Organic light-emitting display panels are display panels that display images using organic light-emitting elements (or organic light-emitting diodes) that emit light by recombination of electrons and holes. Organic light-emitting display panels generally have a relatively fast response speed and may be driven with relatively low power consumption. Further, the organic light-emitting display panel may be lightweight and thin, and may be applied to a flexible display device.

Organic light-emitting display panels may have a relatively limited lifespan, and may deteriorate over time such that the light-emitting efficiency may decrease. For example, the lifespan of organic light-emitting elements may gradually decrease with a usage time, and a driving voltage applied to organic light-emitting elements for the same image may change (for example, gradually increase) with the usage time. The lifespan of organic light-emitting display panels or organic light-emitting elements may be an important criterion for commercializing display devices.

SUMMARY

Aspects of some embodiments relate to a method for evaluating a lifespan of a display panel. For example, aspects of some embodiments relate to a method for evaluating a lifespan of a mixed color area of a display panel and a lifespan evaluation system for the display panel to perform the same.

Aspects of some embodiments include a method for evaluating a lifespan of a display panel for accurately evaluating a lifespan of a mixed color area of the display panel.

Aspects of some embodiments include a lifespan evaluation system for a display panel to perform the method for evaluating the lifespan of the display panel.

A method for evaluating a lifespan of a display panel according to some embodiments may include deteriorating a display panel including a first single color area which displays a first single color, a second single color area which displays a second single color, a third single color area which displays a third single color, and a mixed color area which displays a mixed color in which the first to third single colors are mixed, measuring first single color luminance retention rates of the first to third single color areas and a first mixed color luminance retention rate of the mixed color area at a plurality of luminance measurement time points, calculating mixed color spectrums of the mixed color area at the luminance measurement time points based on second single color luminance retention rates of the first to third single color areas converted from the first single color luminance retention rates, calculating mixed color offset values based on the mixed color spectrums, and calculating a second mixed color luminance retention rate of the mixed color area by applying the mixed color offset values to the first mixed color luminance retention rate.

According to some embodiments, the mixed color may be white.

According to some embodiments, the first single color, the second single color, and the third single color may be red, green, and blue, respectively.

According to some embodiments, the first single color luminance retention rates and the first mixed color luminance retention rate may be measured by a photodiode at the luminance measurement time points.

According to some embodiments, the second single color luminance retention rates and the second mixed color luminance retention rate may be luminance retention rates measured by a luminance meter.

According to some embodiments, the method may further include measuring single color spectrums of the first to third single color areas at a spectrum measurement time point.

According to some embodiments, the single color spectrums may be measured by a spectrometer at the spectrum measurement time point.

According to some embodiments, the spectrum measurement time point may be after a deterioration of the display panel ends.

According to some embodiments, the method may further include calculating single color offset values based on the single color spectrums, and calculating the second single color luminance retention rates by applying the single color offset values to the first single color luminance retention rates.

According to some embodiments, the second mixed color luminance retention rate may be $LR1 \times RT1 + LR2 \times RT2 + LR3 \times RT3$. LR1 is the second single color luminance retention rate of the first single color area, RT1 is a luminance ratio of the first single color to the mixed color, LR2 is the second single color luminance retention rate of the second single color area, RT2 is a luminance ratio of the second single color to the mixed color, LR3 is the second single color luminance retention rate of the third single color area, and RT3 is a luminance ratio of the third single color to the mixed color.

According to some embodiments, each of the first to third single color areas may include a plurality of single color patterns having different deterioration conditions. The mixed color area may include a plurality of mixed color patterns having the different deterioration conditions. The mixed color spectrums may be calculated at the luminance measurement time points for each of the deterioration conditions.

A lifespan evaluation system for a display panel according to some embodiments may include a display panel including a first single color area which displays a first single color, a second single color area which displays a second single color, a third single color area which displays a third single color, and a mixed color area which displays a mixed color in which the first to third single colors are mixed, a panel driving device which controls an emission of the display panel to deteriorate the display panel, a luminance measuring device which measures first single color luminance retention rates of the first to third single color areas and a first mixed color luminance retention rate of the mixed color area at a plurality of luminance measurement time points, a lifespan calculating device which calculates mixed color spectrums of the mixed color area at the luminance measurement time points based on second single color luminance retention rates of the first to third single color areas converted from the first single color luminance retention rates, calculates mixed color offset values based on the mixed color spectrums, and calculates a second mixed color luminance retention rate of the mixed color area by applying the mixed color offset values to the first mixed color luminance retention rate.

According to some embodiments, the mixed color may be white.

According to some embodiments, the first single color, the second single color, and the third single color may be red, green, and blue, respectively.

According to some embodiments, the luminance measuring device may include a photodiode.

According to some embodiments, the second single color luminance retention rates and the second mixed color luminance retention rate may be luminance retention rates measured by a luminance meter.

According to some embodiments, the lifespan evaluation system may further include a spectrometer which measures single color spectrums of the first to third single color areas at a spectrum measurement time point.

According to some embodiments, the spectrum measurement time point may be after a deterioration of the display panel ends.

According to some embodiments, the lifespan calculating device may calculate single color offset values based on the single color spectrums, and may calculate the second single color luminance retention rates by applying the single color offset values to the first single color luminance retention rates.

According to some embodiments, each of the first to third single color areas may include a plurality of single color patterns having different deterioration conditions. The mixed color area may include a plurality of mixed color patterns having the different deterioration conditions. The mixed color spectrums may be calculated at the luminance measurement time points for each of the deterioration conditions.

In the method for evaluating the lifespan of the display panel and the lifespan evaluation system for the display panel according to some embodiments, the mixed color spectrums of the mixed color area at the luminance measurement time points may be calculated based on the second single color luminance retention rates of the first to third single color areas, the mixed color offset values may be calculated based on the mixed color spectrums, and the second mixed color luminance retention rate of the mixed color area may be calculated by applying the mixed color offset values to the first mixed color luminance retention rate of the mixed color area, so that the second mixed color luminance retention rate may be relatively accurately calculated. Accordingly, the lifespan of the mixed area of the display panel may be relatively accurately evaluated based on the second mixed color luminance retention rate.

BRIEF DESCRIPTION OF THE DRAWINGS

Illustrative, non-limiting embodiments will be more clearly understood from the following detailed description taken in conjunction with the accompanying drawings.

FIG. 4 is a view for describing first luminance retention rates for each deterioration condition.

DETAILED DESCRIPTION

Figure 1:
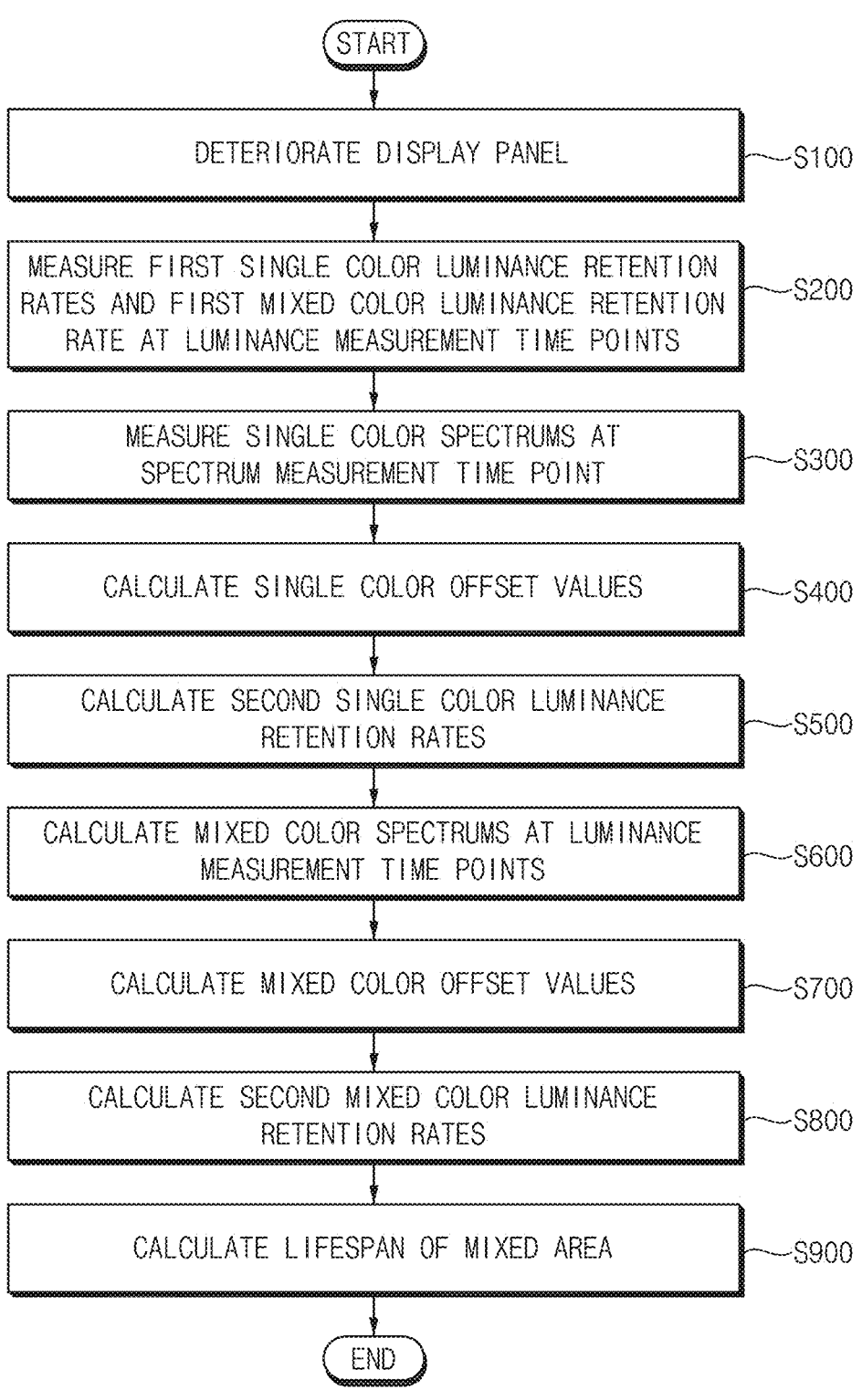
FIG. 1 is a flowchart showing a method for evaluating a lifespan of a display panel according to some embodiments.

Hereinafter, a method for evaluating a lifespan of a display panel and a lifespan evaluation system for a display panel according to some embodiments of the present disclosure will be described in more detail with reference to the accompanying drawings. The same or similar reference numerals will be used for the same elements in the accompanying drawings.

FIG. 1 is a flowchart showing a method for evaluating a lifespan of a display panel according to some embodiments. Although FIG. 1 illustrates various operations in a method for evaluating a lifespan of a display panel, embodiments according to the present disclosure are not limited thereto, and according to some embodiments, the method may include additional operations, or fewer operations, or the order of operations may change, unless otherwise stated or implied, without departing from the spirit and scope of embodiments according to the present disclosure.

Figure 2:
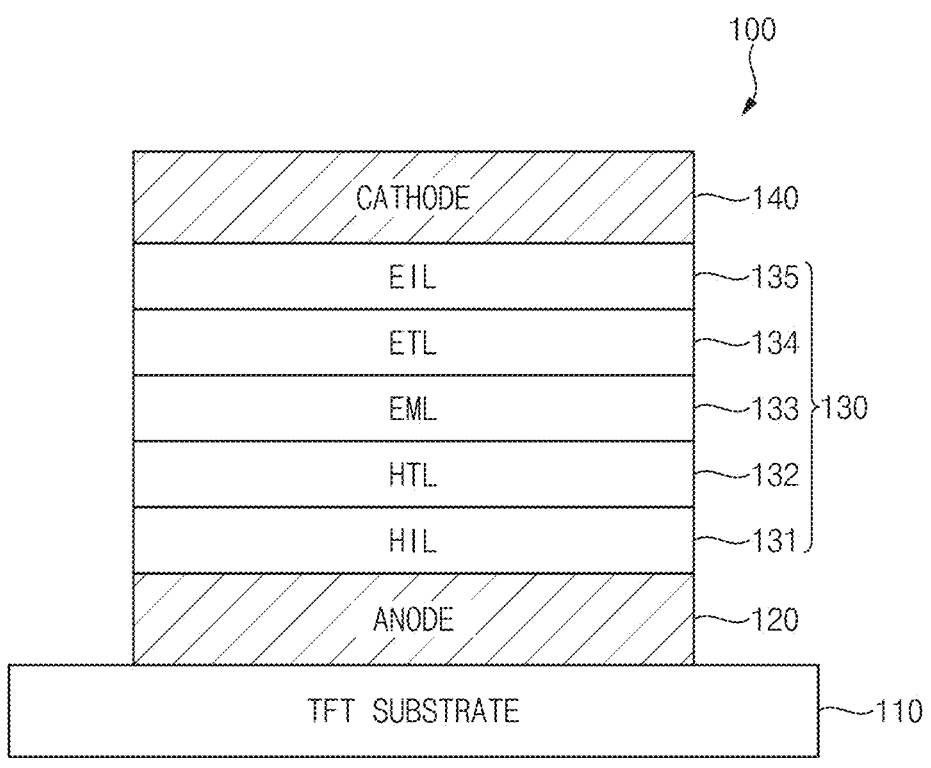
FIG. 2 is a view showing an example of a display panel.
Figure 3:
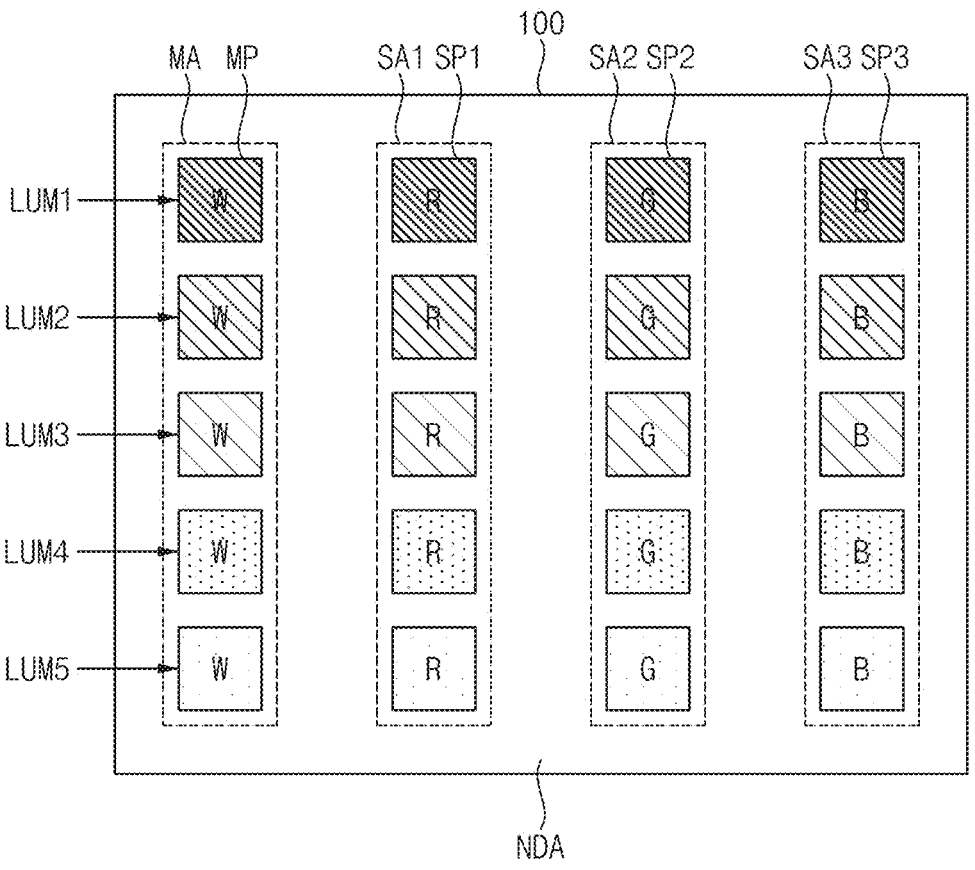
FIG. 3 is a view for describing a deterioration of a display panel.
Figure 5:
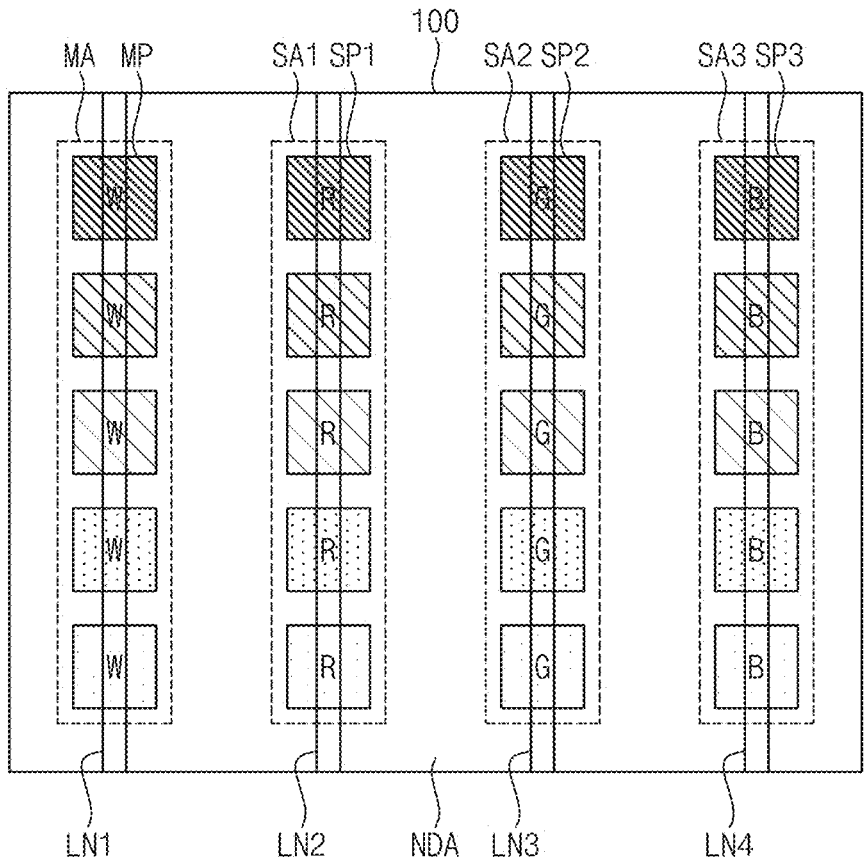
FIG. 5 is a view for describing a spectrum measurement of a display panel.
Figure 6:
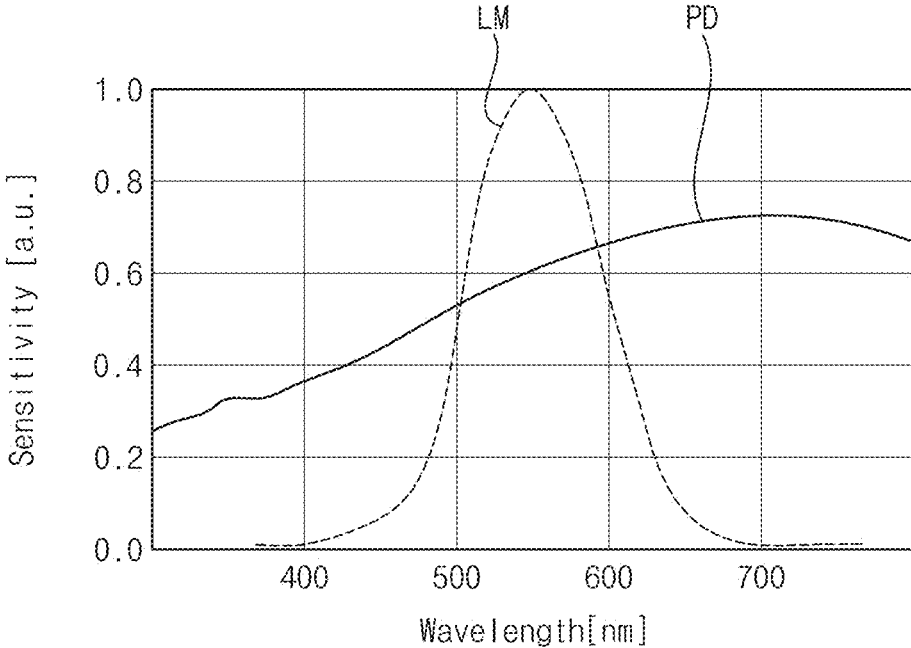
FIG. 6 is a view showing an example of a sensitivity of a photodiode and a sensitivity of a luminance meter.
Figure 7:
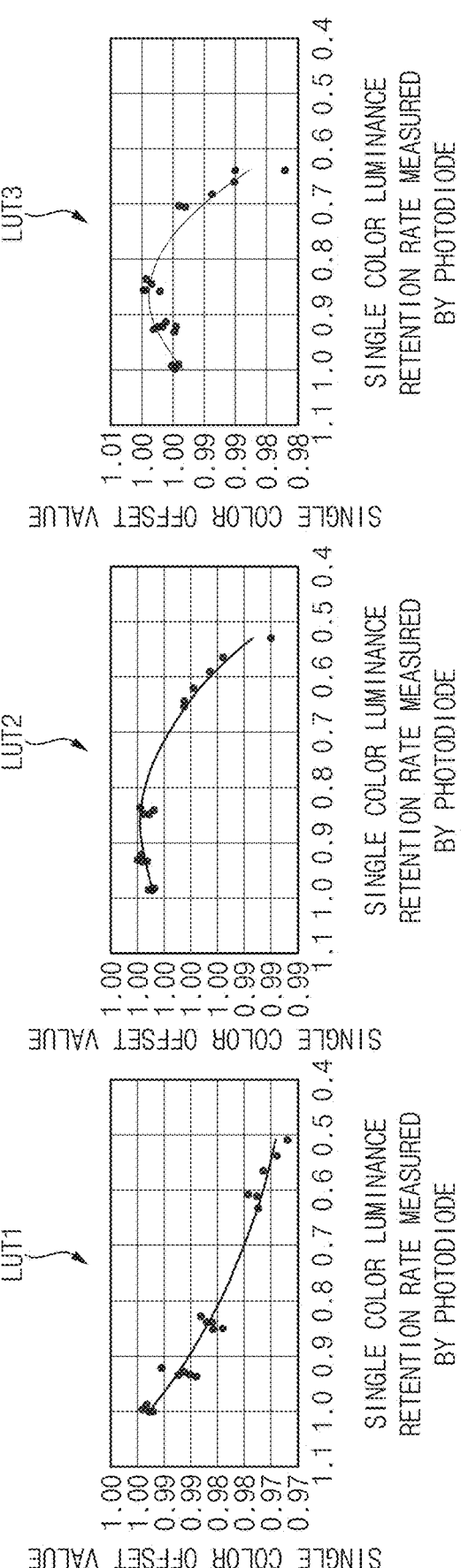
FIG. 7 is a view for describing single color offset values.
Figure 8:
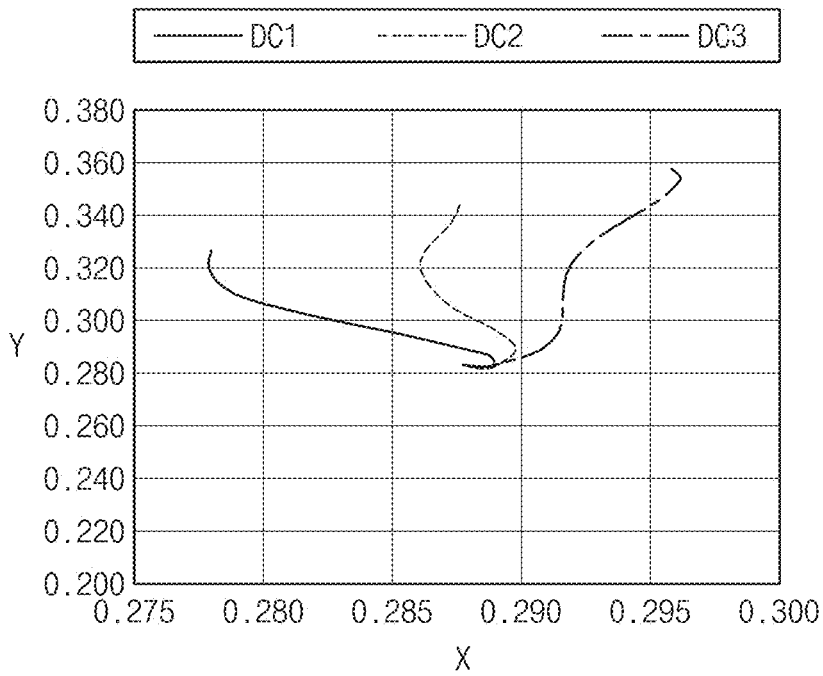
FIG. 8 is a view for a change path of a color coordinate of a mixed color.

FIG. 2 is a view showing an example of a display panel 100. FIG. 3 is a view for describing a deterioration of the display panel 100. FIG. 4 is a view for describing first luminance retention rates for each deterioration condition. FIG. 5 is a view for describing a spectrum measurement of the display panel 100. FIG. 6 is a view showing an example of a sensitivity of a photodiode PD and a sensitivity of a luminance meter LM. FIG. 7 is a view for describing single color offset values. FIG. 8 is a view for a change path of a color coordinate of a mixed color.

Referring to FIGS. 1, 2, 3, 4, 5, 6, 7, and 8, a method for evaluating a lifespan of a display panel 100 may include deteriorating the display panel 100 (S100), measuring first single color luminance retention rates and a first mixed color luminance retention rate at luminance measurement time points (S200), measuring single color spectrums at a spectrum measurement time point (S300), calculating single color offset values (S400), calculating second single color luminance retention rates (S500), calculating mixed color spectrums at the luminance measurement time points (S600), calculating mixed color offset values (S700), calculating second mixed color luminance retention rates (S800), and calculating a lifespan of a mixed color area MA (S900).

According to some embodiments, as shown in FIG. 2, the display panel 100 may include a thin film transistor ("TFT") substrate 110 including a TFT, an anode 120 located on the TFT substrate 110, an organic layer 130 located on the anode 120, and a cathode 140 located on the organic layer 130. The display panel 100 may emit light when excitons, which are formed by combining holes injected into the organic layer 130 from the anode 120 and electrons injected into the organic layer 130 from the cathode 140, drops from an excited state to a ground state.

The organic layer 130 may include an emission layer ("EML") 133. According to some embodiments, the organic layer 130 may further include at least one of a hole injection layer ("HIL") 131, a hole transport layer ("HTL") 132, an electron transport layer ("ETL") 134, or an electron injection layer ("EIL") 135. The HIL 131 may inject holes into the EML 133. The HTL 132 is a layer having excellent hole transport properties, and may suppress the movement of electrons that are not combined in the EML 133 thereby increasing the chance of recombination of holes and electrons. The ETL 134 may smoothly transport electrons to the EML 133. The EIL 135 may inject electrons toward the ETL 134 or the EML 133.

According to some embodiments, the organic layer 130 may further include a hole suppression layer for suppressing the movement of holes that are not combined in the EML 133.

According to some embodiments, the anode 120 may include a reflective film capable of reflecting light, and a transparent conductive film located on top and/or bottom of the reflective film. At least one of the transparent conductive film or the reflective film may be electrically connected to the TFT included in the TFT substrate 110.

The reflective film may include a material capable of reflecting light. For example, the reflective film may include at least one of aluminum (Al), silver (Ag), chromium (Cr), molybdenum (Mo), platinum (Pt), nickel (Ni), or alloys thereof.

The transparent conductive film may include a transparent conductive oxide. For example, the transparent conductive film may include at least one of ITO (Indium Tin Oxide), IZO (Indium Zinc Oxide), AZO (Aluminum Zinc Oxide), GZO (gallium doped zinc oxide), ZTO (zinc tin oxide), GTO (gallium tin oxide), or FTO (fluorine doped tin oxide).

According to some embodiments, the cathode 140 may be a semi-transparent reflective film. For example, the cathode 140 may be a thin metal layer having a thickness sufficient to transmit light. The cathode 140 may transmit some of the light generated in the ETL 133, and may reflect some of the light generated in the ETL 133.

According to some embodiments, the cathode 140 may include a material having a lower work function than the transparent conductive film. For example, the cathode 140 may include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or alloys thereof.

According to some embodiments, some of the light emitted from the EML 133 may not pass through the cathode 140, and the light reflected from the cathode 140 may be reflected again from the reflective film. In other words, the light emitted from the EML 133 may resonate between the reflective film and the cathode 140. The light extraction efficiency of the light-emitting element may be relatively improved by the resonance of the light.

The organic light-emitting elements included in the display panel 100 may have different light extraction efficiencies and different lifespans depending on colors of light emitted from the organic light-emitting elements. In other words, because the luminance of the display panel 100 gradually decreases with the use of the display panel 100 due to deterioration of organic material caused by external/internal influences on the organic light-emitting elements, lifespan evaluation of the light-emitting elements may be essential for evaluating the performance of the display panel 100.

The display panel 100 may include a deterioration area and a non-deterioration area NDA. According to some embodiments, as shown in FIG. 3, the deterioration area may include a first single color area SA1, a second single color area SA2, a third single color area SA3, and a mixed color area MA. The first single color area SA1 may display a first single color R, the second single color area SA2 may display a second single color G that is different from the first single color R, the third single color area SA3 may display a third single color B that is different from the first single color R and the second single color G, and the mixed color area MA may display a mixed color W in which the first to third single colors R, G, and B are mixed.

According to some embodiments, the mixed color W may be white.

According to some embodiments, the first single color R, the second single color G, and the third single color B may be red, green, and blue, respectively. However, embodiments according to the present disclosure are not limited thereto, and according to some embodiments, the first single color R, the second single color G, and the third single color B may be cyan, magenta, and yellow, respectively.

Hereinafter, it will be described on the premise that the mixed color W, the first single color R, the second single color G, and the third single color B are white, red, green, and blue, respectively.

When the deterioration of the display panel 100 starts, the display panel 100 may be deteriorated while emitting light in the mixed color area MA, the first single color area SA1, the second single color area SA2, and the third single color area SA3 (S100). Each of the mixed color area MA, the first single color area SA1, the second single color area SA2, and the third single color area SA3 may include a plurality of deterioration patterns having different deterioration conditions. The mixed color area MA may include a plurality of mixed color patterns MP having different deterioration conditions, the first single color area SA1 may include a plurality of first single color patterns SP1 having different deterioration conditions, the second single color area SA2 may include a plurality of second single color patterns SP2 having different deterioration conditions, and the third single color area SA3 may include a plurality of third single color patterns SP3 having different deterioration conditions.

According to some embodiments, the deterioration condition may be a luminance. For example, the mixed color pattern MP, the first single color pattern SP1, the second single color pattern SP2, and the third single color pattern SP3 in a first row may be deteriorated with a first luminance LUM1, the mixed color pattern MP, the first single color pattern SP1, the second single color pattern SP2, and the third single color pattern SP3 in a second row may be deteriorated with a second luminance LUM2 lower than the first luminance LUM1, the mixed color pattern MP, the first single color pattern SP1, the second single color pattern SP2, and the third single color pattern SP3 in a third row may be deteriorated with a third luminance LUM3 lower than the second luminance LUM2, the mixed color pattern MP, the first single color pattern SP1, the second single color pattern SP2, and the third single color pattern SP3 in a fourth row may be deteriorated with a fourth luminance LUM4 lower than the third luminance LUM3, and the mixed color pattern MP, the first single color pattern SP1, the second single color pattern SP2, and the third single color pattern SP3 in a fifth row may be deteriorated with a fifth luminance LUM5 lower than the fourth luminance LUM4. For example, the first luminance LUM1 may be about 2193 nits, the third luminance LUM3 may be about 1000 nits, and the fifth luminance LUM5 may be about 500 nits.

After the deterioration of the display panel 100 starts, the first single color luminance retention rates of the first to third single color areas SA1, SA2, and SA3 and the first mixed color luminance retention rate of the mixed color area MA may be measured at a plurality of luminance measurement time points (S200). A first luminance retention rate, which includes the first single color luminance retention rates and the first mixed color luminance retention rate, may be a ratio of a luminance of the deterioration pattern at the luminance measurement time point to a luminance of the deterioration pattern when the deterioration of the display panel 100 starts.

FIG. 4 shows a deterioration curve showing a relationship between a deterioration time and the first luminance retention rate for each color under the first to third deterioration conditions DC1, DC2, and DC3. The first deterioration condition DC1 may be the first luminance LUM1, the second deterioration condition DC2 may be the third luminance LUM3, and the third deterioration condition DC3 may be the fifth luminance LUM5.

As shown in FIG. 4, as the deterioration of the display panel 100 progresses (as the deterioration time passes), the first luminance retention rate may decrease. The first luminance retention rate of the deterioration patterns deteriorated with the first luminance LUM1 higher than the third luminance LUM3 may decrease faster than the first luminance retention rate of the deterioration patterns deteriorated with the third luminance LUM3, and the first luminance retention rate of the deterioration patterns deteriorated with the fifth luminance LUM5 lower than the third luminance LUM3 may decrease slower than the first luminance retention rate of the deterioration patterns deteriorated with the third luminance LUM3.

According to some embodiments, the first single color luminance retention rates and the first mixed color luminance retention rate may be measured by a photodiode at the luminance measurement time points. For the automation of the lifespan evaluation, the first single color luminance retention rates and the first mixed color luminance retention rate may be automatically measured using the photodiode at the luminance measurement time points (e.g., set or predetermined luminance measurement time points), and accordingly, the cost of the lifespan evaluation for the display panel 100 may be relatively reduced.

The single color spectrums of the first to third single color areas SA1, SA2, and SA3 and the mixed color spectrum of the mixed color area MA may be measured at a spectrum measurement time point (S300). For example, as shown in FIG. 5, the mixed color spectrum of the mixed color area MA may be measured along a first line LN1 extending in a column direction, the single color spectrum of the first single color area SA1 may be measured along a second line LN2 extending in the column direction, the single color spectrum of the second single color area SA2 may be measured along a third line LN3 extending in the column direction, and the single color spectrum of the third single color area SA3 may be measured along a fourth line LN4 extending in the column direction.

For example, at the spectrum measurement time point, the single color spectrums of the first single color patterns SP1 and a spectrum of the non-deterioration area NDA may be measured along the second line LN2, the single color spectrums of the second single color patterns SP2 and a spectrum of the non-deterioration area NDA may be measured along the third line LN3, and the single color spectrums of the third single color patterns SP3 and a spectrum of the non-deterioration area NDA may be measured along the fourth line LN4.

According to some embodiments, the single color spectrums and the mixed color spectrum may be measured by a spectrometer at the spectrum measurement time point.

According to some embodiments, the spectrum measurement time point may be after the deterioration of the display panel 100 ends.

The single color offset values may be calculated based on the single color spectrums (S400).

As shown in FIG. 6, a photosensitivity of the photodiode PD that measures the first single color luminance retention rates and the first mixed color luminance retention rate at the luminance measurement time points may be different from a photosensitivity of the luminance meter LM that is close to human visual characteristics. Accordingly, offset values may be required to convert luminance retention rates (e.g., the first single color luminance retention rates and the first mixed color luminance retention rate) measured by the photodiode PD into luminance retention rates (e.g., the second single color luminance retention rates and the second mixed color luminance retention rate) measured by the luminance meter LM.

The single color offset values may be calculated using the single color spectrums, the photosensitivity of the photodiode PD, and the photosensitivity of the luminance meter LM. The single color luminance retention rates measured by the photodiode PD may be calculated by applying the photosensitivity of the photodiode PD to the single color spectrums, and the single color luminance retention rates measured by the luminance meter LM may be calculated by applying the photosensitivity of the luminance meter LM to the single color spectrums. The single color offset values may be calculated as values obtained by dividing the single color luminance retention rates measured by the photodiode PD by the single color luminance retention rates measured by the luminance meter LM.

As shown in FIG. 7, a relationship between the single color luminance retention rates for the first single color R measured by the photodiode PD and the single color offset values for the first single color R may be stored in a first lookup table LUT1, a relationship between the single color luminance retention rates for the second single color G measured by the photodiode PD and the single color offset values for the second single color G may be stored in a second lookup table LUT2, and a relationship between the single color luminance retention rates for the third single color B measured by the photodiode PD and the single color offset values for the B single color B may be stored in a third lookup table LUT3. Since a ratio of the photosensitivity of the photodiode PD and the photosensitivity of the luminance meter LM differs for each wavelength, the single color offset values stored in the first lookup table LUT1, the single color offset values stored in the second lookup table LUT2, and the single color offset values stored in the third lookup table LUT3 may be different from each other.

The second single color luminance retention rates may be calculated by applying the single color offset values to the first single color luminance retention rates (S500). For example, the second single color luminance retention rate of the first single color area SA1 may be calculated by multiplying the first single color luminance retention rate of the first single color area SA1 by the single color offset value stored in the first lookup table LUT1, the second single color luminance retention rate of the second single color area SA2 may be calculated by multiplying the first single color luminance retention rate of the second single color area SA2 by the single color offset value stored in the second lookup table LUT2, and the third single color luminance retention rate of the third single color area SA3 may be calculated by multiplying the first single color luminance retention rate of the third single color area SA3 by the single color offset value stored in the third lookup table LUT3. Since the first single color luminance retention rates measured by the photodiode PD at the luminance measurement time points are converted into the second single color luminance retention rates by being compensated for by the single color offset values, the single color luminance retention rates of the first to third single color areas SA1, SA2, and SA3 reflecting the visual characteristics may be relatively accurately calculated.

The second single color luminance retention rates of the first to third single color areas SA1, SA2, and SA3 may be relatively accurately calculated using the single color spectrums measured at the spectrum measurement time point, but the second mixed color luminance retention rate of the mixed color area MA may not be accurately calculated using the mixed color spectrum measured at the spectrum measurement time point. As shown in FIG. 4, the deterioration curves, which represents the relationship between the deterioration time and the luminance retention rate, may be different under the same deterioration condition for each color, and the deterioration curves may be different in the same color for each deterioration condition. When calculating offset values using a spectrum measured at a specific time point (e.g., the spectrum measurement time point), the single color offset values may be relatively accurately calculated because change paths of the color coordinate of the first to third single colors R, G, and B due to deterioration are substantially the same for each deterioration condition, but as shown in FIG. 8, the mixed color offset values may not be relatively accurately calculated because change paths of the color coordinate of the mixed color W due to deterioration are different for each deterioration condition DC1, DC2, and DC3. The mixed color offset values may be relatively accurately calculated when measuring the mixed color spectrums of the mixed color area MA at the luminance measurement time points, but measuring the mixed color spectrum using the spectrometer at each luminance measurement time point may be difficult or practically impossible, and the cost of evaluating the lifespan for the display panel 100 may increase.

Accordingly, in the embodiments of the present disclosure, the mixed color offset values may be calculated by calculating mixed color spectrums at the luminance measurement time points without using the mixed color spectrum measured at the spectrum measurement time point. Accordingly, the second mixed color luminance retention rate may be relatively accurately calculated by compensating for the first mixed color luminance retention rate by the mixed color offset values.

Hereinafter, a method for accurately calculating the second mixed color luminance retention rate according to the embodiments of the present disclosure will be described.

The mixed color spectrums of the mixed color area MA at the luminance measurement time points may be calculated based on the second single color luminance retention rates (S600). According to some embodiments, the mixed color spectrums at the luminance measurement time points may be calculated for each deterioration condition. Because the second single color luminance retention rates are relatively accurately calculated for each deterioration condition, change paths of the color coordinate of the mixed color may be calculated based on the second single color luminance retention rates. In other words, the mixed color spectrums at the luminance measurement time points may be calculated for each deterioration condition based on the second single color luminance retention rates without measuring the mixed color spectrums of the mixed color area MA at the luminance measurement time points with the spectrometer.

The mixed color offset values may be calculated based on the mixed color spectrums (S700).

The mixed color offset values may be calculated using the mixed color spectrums, the photosensitivity of the photodiode PD, and the photosensitivity of the luminance meter LM. The mixed color luminance retention rates measured by the photodiode PD may be calculated by applying the photosensitivity of the photodiode PD to the mixed color spectrums, and the mixed color luminance retention rates measured by the luminance meter LM may be calculated by applying the photosensitivity of the luminance meter LM to the mixed color spectrums. The mixed color offset values may be calculated as values obtained by dividing the mixed color luminance retention rates measured by the photodiode PD by the mixed color luminance retention rates measured by the luminance meter LM. For example, a relationship between the mixed color luminance retention rates measured by the photodiode PD and the mixed color offset values may be stored in a lookup table.

The second mixed color luminance retention rates may be calculated by applying the mixed color offset values to the first mixed color luminance retention rates (S800). For example, the second mixed color luminance retention rate may be calculated by multiplying the mixed color luminance retention rate by the mixed color offset value stored in the lookup table. Since the first mixed color luminance retention rate measured by the photodiode PD at the luminance measurement time points is compensated for by the mixed color offset values and converted into the second mixed color luminance retention rate, the mixed color luminance retention rate reflecting the visual characteristics may be relatively accurately calculated.

According to some embodiments, the second mixed color luminance retention rate LMRM may be calculated by Equation 1.

$$LMRM = LR1 \times RT1 + LR2 \times RT2 + LR3 \times RT3 \qquad \text{[Equation 1]}$$

In Equation 1, LR1 is the second single color luminance retention rate of the first single color area SA1, RT1 is a luminance ratio of the first single color R to the mixed color W, LR2 is the second single color luminance retention rate of the second single color area SA2, RT2 is a luminance ratio of the second single color G to the mixed color W, LR3 is the second single color luminance retention rate of the third single color area SA3, and RT3 is a luminance ratio of the third single color B to the mixed color W.

The lifespan of the mixed color area MA may be calculated based on the second mixed color luminance retention rate (S900). For example, the lifespan of the mixed color area MA may be defined as a deterioration time point at which the second mixed color luminance retention rate becomes approximately 50%. However, the deterioration time point defining the lifespan of the mixed area MA is not limited thereto.

Figure 9:
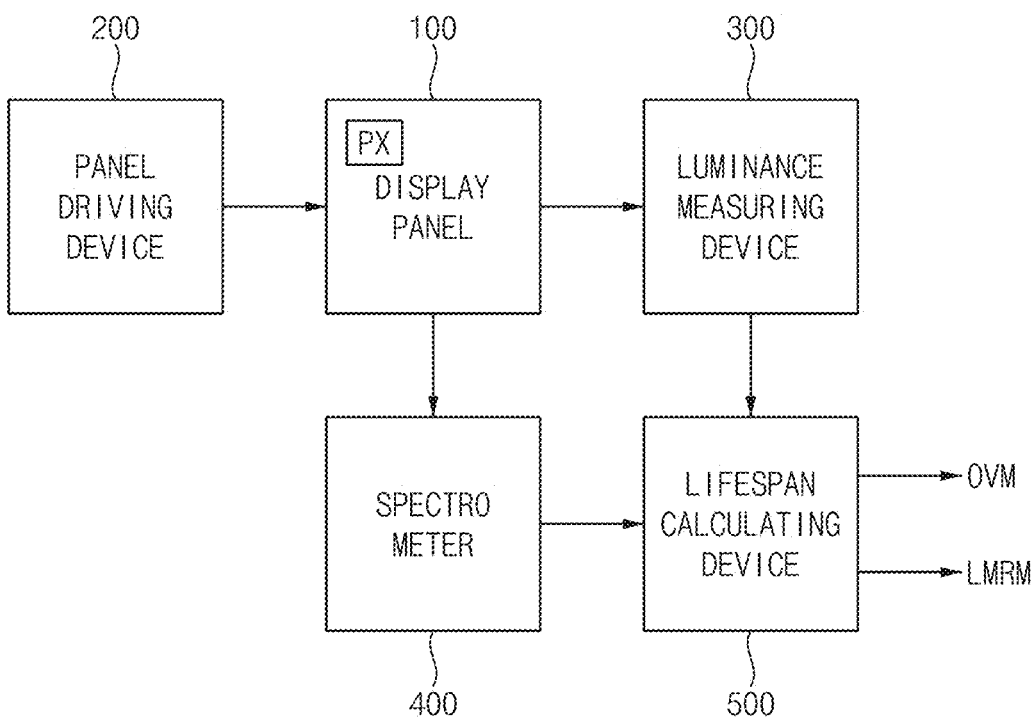
FIG. 9 is a block diagram showing a lifespan evaluation system for a display panel according to some embodiments.

FIG. 9 is a block diagram showing a lifespan evaluation system for a display panel according to some embodiments.

Referring to FIGS. 3 and 9, the lifespan evaluation system for the display panel may include a display panel 100, a panel driving device 200, a luminance measuring device 300, a spectrometer 400, and a lifespan calculating device 500.

According to some embodiments, the lifespan evaluation system may further include a receiver in which the display panel 100 is mounted and in which the display panel 100 is connected to the panel driving device 200.

The display panel 100 may include pixels PX. Each of the pixels PX may include one of a first light-emitting element that emits light having a first single color R, a second light-emitting element that emits light having a second single color G, and a third light-emitting element that emits light having a third single color B. Since the structure of the display panel 100 is described in detail with reference to FIG. 2, a redundant description will be omitted.

The panel driving device 200 may control an emission of the display panel 100 to deteriorate the display panel 100. For example, the panel driving device 200 may determine the deterioration area (e.g., the mixed color area MA and the first to third single color areas SA1, SA2, and SA3) and the light-emitting elements that emit light in the deterioration area.

According to some embodiments, the panel driving device 200 may provide the display panel 100 with power voltages, scan signals, and data signals for driving the display panel 100. The panel driving device 200 may include hardware components and/or software components for driving the display panel 100.

According to some embodiments, while the display panel 100 deteriorates, the first to third light-emitting elements may emit light in the mixed color area MA, the first light-emitting element may emit light in the first single color area SA1, the second light-emitting element may emit light in the second single color area SA2, and the third light-emitting element may emit light in the third single color area SA3.

The luminance measuring device 300 may measure the first single color luminance retention rates of the first to third single color areas SA1, SA2, and SA3 and the first mixed color luminance retention rate of the mixed color area MA at the luminance measurement time points. The first single color luminance retention rates and the first mixed color luminance retention rate may be provided to the lifespan calculating device 500.

According to some embodiments, the luminance measuring device 300 may include a photodiode. The first single color luminance retention rates and the first mixed color luminance retention rate may be measured by sensing a current and/or voltage output from the photodiode.

The spectrometer 400 may measure the single color spectrums of the first to third single color areas SA1, SA2, and SA3 at the spectrum measurement time point. The single color spectrums may be provided to the lifespan calculating device 500.

The lifespan calculating device 500 may calculate the lifespans of the first to third single color areas SA1, SA2, and SA3 and the mixed color area MA.

The lifespan calculating device 500 may calculate the single color offset values based on the single color spectrums, and may calculate the second single color luminance retention rates by applying the single color offset values to the first single color luminance retention rates. Accordingly, the single color luminance retention rates of the first to third single color areas SA1, SA2, and SA3 reflecting the visual characteristics may be relatively accurately calculated.

The lifespan calculating device 500 may calculate the mixed color spectrums of the mixed color area MA at the luminance measurement time points based on the second single color luminance retention rates, may calculate the mixed color offset values OVM based on the mixed color spectrums, and may calculate the second mixed color luminance retention rate LMRM by applying the mixed color offset values OVM to the first mixed color luminance retention rate. Accordingly, the mixed color luminance retention rate of the mixed color area MA reflecting the visual characteristics may be relatively accurately calculated. For example, the lifespan calculating device 500 may store the mixed color offset values OVM in a lookup table, and may store the second mixed color luminance retention rate LMRM in a memory.

Since the operation of the lifespan evaluation system for the display panel is described in detail with reference to FIGS. 1 to 8, a redundant description will be omitted.

The method for evaluating a lifespan of a display panel according to the embodiments may be applied to a lifespan evaluation for a display panel of a display device included in a computer, a notebook, a mobile phone, a smart phone, a smart pad, a smart watch, a PMP, a PDA, an MP3 player, or the like.

Although the methods for evaluating a lifespan of a display panel and the lifespan evaluation systems for the display panel according to the embodiments have been described with reference to the drawings, the shown embodiments are examples, and may be modified and changed by a person having ordinary knowledge in the relevant technical field without departing from the technical spirit described in the following claims, and their equivalents.

What is claimed is:

1. A method for evaluating a lifespan of a display panel, the method comprising:

deteriorating a display panel including a first single color area which displays a first single color, a second single color area which displays a second single color, a third single color area which displays a third single color, and a mixed color area which displays a mixed color in which the first to third single colors are mixed;

measuring first single color luminance retention rates of the first to third single color areas and a first mixed color luminance retention rate of the mixed color area at a plurality of luminance measurement time points;

calculating mixed color spectrums of the mixed color area at the luminance measurement time points based on second single color luminance retention rates of the first to third single color areas converted from the first single color luminance retention rates;

calculating mixed color offset values based on the mixed color spectrums; and calculating a second mixed color luminance retention rate of the mixed color area by applying the mixed color offset values to the first mixed color luminance retention rate.

2. The method of claim 1, wherein the first single color luminance retention rates and the first mixed color luminance retention rate are measured by a photodiode at the luminance measurement time points.

3. The method of claim 1, wherein the second single color luminance retention rates and the second mixed color luminance retention rate are luminance retention rates measured by a luminance meter.

4. The method of claim 1, wherein each of the first to third single color areas includes a plurality of single color patterns having different deterioration conditions, wherein the mixed color area includes a plurality of mixed color patterns having the different deterioration conditions, and wherein the mixed color spectrums are calculated at the luminance measurement time points for each of the deterioration conditions.

5. The method of claim 1, wherein the mixed color is white.

6. The method of claim 5, wherein the first single color, the second single color, and the third single color are red, green, and blue, respectively.

7. The method of claim 1, further comprising:

measuring single color spectrums of the first to third single color areas at a spectrum measurement time point.

8. The method of claim 7, wherein the single color spectrums are measured by a spectrometer at the spectrum measurement time point.

9. The method of claim 7, wherein the spectrum measurement time point is after a deterioration of the display panel ends.

10. The method of claim 7, further comprising:

calculating single color offset values based on the single color spectrums; and calculating the second single color luminance retention rates by applying the single color offset values to the first single color luminance retention rates.

11. The method of claim 10, wherein the second mixed color luminance retention rate is LR1×RT1+LR2×RT2+LR3×RT3, and wherein LR1 is the second single color luminance retention rate of the first single color area, RT1 is a luminance ratio of the first single color to the mixed color, LR2 is the second single color luminance retention rate of the second single color area, RT2 is a luminance ratio of the second single color to the mixed color, LR3 is the second single color luminance retention rate of the third single color area, and RT3 is a luminance ratio of the third single color to the mixed color.

12. A lifespan evaluation system for a display panel, comprising:

a display panel including a first single color area configured to display a first single color, a second single color area configured to display a second single color, a third single color area configured to display a third single color, and a mixed color area configured to display a mixed color in which the first to third single colors are mixed;

a panel driving device configured to control an emission of the display panel to deteriorate the display panel;

a luminance measuring device configured to measure first single color luminance retention rates of the first to third single color areas and a first mixed color luminance retention rate of the mixed color area at a plurality of luminance measurement time points;

a lifespan calculating device configured to calculate mixed color spectrums of the mixed color area at the luminance measurement time points based on second single color luminance retention rates of the first to third single color areas converted from the first single color luminance retention rates, to calculate mixed color offset values based on the mixed color spectrums, and to calculate a second mixed color luminance retention rate of the mixed color area by applying the mixed color offset values to the first mixed color luminance retention rate.

13. The lifespan evaluation system of claim 12, wherein the luminance measuring device includes a photodiode.

14. The lifespan evaluation system of claim 12, wherein the second single color luminance retention rates and the second mixed color luminance retention rate are luminance retention rates measured by a luminance meter.

15. The lifespan evaluation system of claim 12, wherein each of the first to third single color areas includes a plurality of single color patterns having different deterioration conditions, wherein the mixed color area includes a plurality of mixed color patterns having the different deterioration conditions, and wherein the mixed color spectrums are calculated at the luminance measurement time points for each of the deterioration conditions.

16. The lifespan evaluation system of claim 12, wherein the mixed color is white.

17. The lifespan evaluation system of claim 16, wherein the first single color, the second single color, and the third single color are red, green, and blue, respectively.

18. The lifespan evaluation system of claim 12, further comprising:

a spectrometer configured to measure single color spectrums of the first to third single color areas at a spectrum measurement time point.

19. The lifespan evaluation system of claim 18, wherein the spectrum measurement time point is after a deterioration of the display panel ends.

20. The lifespan evaluation system of claim 18, wherein the lifespan calculating device is configured to calculate single color offset values based on the single color spectrums, and to calculate the second single color luminance retention rates by applying the single color offset values to the first single color luminance retention rates.

* * * * *